United States Patent [19]

McLoughlin et al.

[11] Patent Number: 4,798,752
[45] Date of Patent: * Jan. 17, 1989

[54] CURABLE SHEET

[75] Inventors: Robert H. McLoughlin; Pushpkumar D. Changani, both of Swindon, England

[73] Assignee: Raychem Limited, London, England

[*] Notice: The portion of the term of this patent subsequent to Mar. 8, 2005 has been disclaimed.

[21] Appl. No.: 794,911

[22] Filed: Nov. 4, 1985

Related U.S. Application Data

[63] Continuation of Ser. No. 583,459, Feb. 24, 1984, abandoned.

[30] Foreign Application Priority Data

Feb. 25, 1983 [GB] United Kingdom ............... 8305312

[51] Int. Cl.⁴ .................. B27N 5/02; B32B 31/08
[52] U.S. Cl. ................................ 428/36; 428/35; 428/44; 428/48; 428/56; 428/58; 428/373; 428/374; 428/398; 428/413; 428/913; 156/85; 156/86; 156/330; 174/DIG. 8; 285/381
[58] Field of Search ............. 428/35, 36, 44, 48, 56, 58, 373, 374, 398, 913, 413; 156/85, 86, 330; 174/84 R, DIG. 8; 285/381

[56] References Cited

U.S. PATENT DOCUMENTS

| | | | |
|---|---|---|---|
| Re. 30,843 | 1/1982 | Flint | 428/48 |
| 3,409,497 | 11/1968 | Roseland | 428/221 |
| 4,024,002 | 5/1977 | Lott | 156/85 |
| 4,271,329 | 6/1981 | Perelmuter | 428/36 X |
| 4,324,827 | 4/1982 | Obayashi et al. | 428/192 |
| 4,427,725 | 1/1984 | Crofts | 428/36 |
| 4,576,666 | 3/1986 | Harris et al. | 156/85 |
| 4,624,720 | 11/1986 | Pithouse et al. | 156/86 |
| 4,626,458 | 12/1986 | Pithouse et al. | 428/36 |
| 4,631,098 | 12/1986 | Pithouse et al. | 156/86 |

FOREIGN PATENT DOCUMENTS

| | | | |
|---|---|---|---|
| 3150544 | 6/1983 | Fed. Rep. of Germany | 428/913 |
| 1088572 | 10/1967 | United Kingdom | 428/36 |
| 1252805 | 11/1971 | United Kingdom | 428/364 |
| 1452785 | 10/1976 | United Kingdom | 428/225 |
| 1497051 | 1/1978 | United Kingdom | 428/224 |
| 2023147 | 12/1979 | United Kingdom | 428/40 |
| 1562050 | 3/1980 | United Kingdom | 428/413 |
| 2048720 | 12/1980 | United Kingdom | 428/67 |
| 2097401 | 11/1982 | United Kingdom | 428/40 |
| 2104800 | 3/1983 | United Kingdom | 428/413 |

OTHER PUBLICATIONS

Mohr, Mixing and Dispersing, in Processing of Thermoplastic Materials, E. C. Bernhardt (ed.), Reinhold Corp. (N.Y.) 1959, pp. 126–127.

*Primary Examiner*—Joseph L. Schofer
*Assistant Examiner*—F. M. Teskin
*Attorney, Agent, or Firm*—Yuan Chao; Edith A. Rice; Herbert G. Burkard

[57] ABSTRACT

A curable sheet comprising first and second curing reactants arranged in discrete areas of the sheet, preferably by coextrusion, in patterns such as stripes and checks. The sheet cures upon fusion of the respective areas of the curing reactants.

16 Claims, 2 Drawing Sheets

STRIPE CONSTRUCTION.

STRIPE CONSTRUCTION.

BLOCK CONSTRUCTION.

CURABLE SHEET

This application is a continuation of application Ser. No. 583,459 filed Feb. 24, 1984, now abandoned.

This invention relates to a curable sheet of polymeric material which may, for example, be useful as a sealing layer between an electrical conductor and a dimensionally recoverable insulating sleeve to be recovered thereon, and to methods of making and using the same.

A heat-recoverable article is an article the dimensional configuration of which may be made substantially to change when subjected to heat treatment.

Usually these articles recover, on heating, towards an original shape from which they have previously been deformed, but the term "heat-recoverable", as used herein, also includes an article which, on heating, adopts a new configuration, even if it has not been previously deformed. References hereinafter to "unresolved recovery" mean the proportion of dimensional recovery actually achieved to the maximum possible, i.e. complete recovery towards original dimensions.

In their most common form, such articles comprise a heat-shrinkable sleeve made from a polymeric material exhibiting the property of elastic or plastic memory. The original dimensionally heat-stable form may be a transient form in a continuous process in which, for example, an extruded tube is expanded, whilst hot, to a dimensionally heat-unstable form but, in other applications, a preformed dimensionally heat stable article is deformed to a dimensionally heat-unstable form in a separate stage.

In the production of heat recoverable articles, the polymeric material may be cross-linked at any stage in the production of the article that will enhance the desired dimensional recoverability. One manner of producing a heat-recoverable article comprises shaping the polymeric material into the desired heat-stable form, subsequently cross-linking the polymeric material, heating the article to a temperature above a transition temperature thereof, for example, the crystalline melting point or, for amorphous materials the softening point, as the case may be, of the polymer, deforming the article and cooling the article whilst in the deformed state so that the deformed state of the article is retained. In use, since the deformed state of the article is heat-unstable, application of heat to raise the temperature above the transition temperature will cause the article to assume its original heat-stable shape.

Where the term "recovery temperature" in connection with heat-recoverable articles is used herein, it is intended to refer to the transition temperature above which the article recovers even if some small degree of recovery is exhibited at temperatures slightly below the transition temperature.

In other known articles, an elastomeric member such as an outer tubular member is held in a stretched state by a second member, such as in inner tubular member, which, upon heating weakens and thus allows the elastomeric member to recover.

Articles of this type have, in recent years, become widely used in a number of applications, for example for protecting objects such as electrical cables and cable splices or metal pipes from corrosion or other damage, for example damage caused by penetration of moisture. For this reason many heat-recoverable articles are provided with a coat of adhesive or sealant.

One problem that is associated with the provision of adhesives on heat-recoverable articles is that, because the heat required to melt or otherwise activate the adhesive is usually supplied by heating the external surface of the heat-recoverable article, the temperature to which the adhesive is heated will be considerably lower than that of the external surface of the article due to the relatively poor thermal conductivity of the materials from which the heat-shrinkable article is formed. Thus, for example, where the heat-shrinkable article is formed from a cross-linked polyethylene, the external surface of the article may be heated up to about 250° C. in order to raise the adhesive temperature to only 100° C., and, in this case, no further heating of the article would be possible without damaging the article. Also, in many cases, the maximum temperature to which the adhesive can be raised is restricted by the type of substrate that is being covered. For example, where the substrate is a metal pipe, the thermal conductivity and size of the pipe cause it to act as a heat-sink and effectively limit the adhesive temperature and, where the substrate comprises an uncrosslinked polymer as is often the case with electrical cable jackets, the adhesive temperature often cannot be raised above about 100° to 120° C. without damaging the cable jacket.

Whilst hot-melt adhesives or mastics can be used in a number of applications, the maximum temperature to which the article may be subjected after installation is usually limited to the melting or softening point of the adhesive.

The present invention provides a curable sheet comprising a plurality of discrete regions of each of at least two mutually reactive polymeric components which components are fusion bonded to each other at least at the mutual edge interfaces of their respective sheet regions in an arrangement such that the said two components can be caused to react together to effect curing of the sheet.

It has unexpectedly been found that improved levels of cure are obtained when a heat-recoverable article is recovered over a sheet according to this invention, and that the reactive components can be co-extruded to form the sheet without unacceptable initial curing reaction and with surprisingly long storage life. The level of cure is especially enhanced when, as is preferred, the melting point of at least one (preferably both) of the said components is selected to be not more than 50° C., preferably not more than 10° C., above the recovery temperature of the article.

It will be understood that "curing" as used herein is not restricted to systems which form rigid chemical cross-links, provided that the components react together when suitably stimulated, e.g. by heating to produce a significant increase in viscosity, an example being polyamide/EVA mixtures which produce such an increase by hydrogen bonding, as described in U.S. Pat. No. 4,018,733. The term "sheet" includes elongate sheets which could be described as "tapes".

The regions of the sheet respectively containing the respective reactive components may be arranged in any convenient array which permits an adequate level of curing reaction between the components in use. One convenient arrangement is for the respective regions to be substantially parallel to one another in the form of "stripes" interspersed with one another across the direction of parallel lie, this arrangement being well suited to extrusion forming of the sheet. Alternatively the regions may be interspersed with one another in two mutually perpendicular senses to produce a "chequer board" arrangement by a method to be described hereinafter. Although three or more kinds of component could be used to form three or more kinds of region, it is preferred to use two kinds of region, in which case the interspersed regions will alternate. The sheet could alternatively be formed by moulding processes, or by laying or weaving elongate bodies (e.g. fibres or filaments) of the components on a support and pressing to fusion bond them to form the sheet.

The curable components of the adhesive composition may be selected according to requirements from known curable systems, provided that they can be formed into the sheet as required.

Preferably the components are such that, if they are brought together into intimate contact for example by dissolving them in a common solvent, they will react together even at room temperature to form a cured product so that curing of the adhesive composition on the article during storage is prevented substantially solely by the physical separation of the components.

In a number of cases it has been found that when a heat-recoverable article is recovered onto a substrate with a sheet according to the invention between the article and the substrate, the adhesive will cure sooner than if it is heated on its own to the same temperature, or will cure at a significantly lower n temperature than it will when heated on its own. The sheet may be carried by the recoverable article or may be applied separately to the substrate then overlaid with the recoverable article. Thus it has been found that it is possible, according to the invention, to provide an adhesive coated heat-recoverable article in which the adhesive can be cured by heating the article to its recovery temperature for periods in the range of the recovery time of the article, but which will also have good storage life.

The rate of curing of curable adhesives at elevated temperatures is linked to their rate of curing at ambient temperatures, and hence their storage life, by the Arrhenius equation which effectively imposes a limit on the rate of cure of an adhesive at the usual recovery temperature of a heat-shrinkable article (about 100° to 120° C.) for any given storage life at ambient temperatures or vice versa. It can be shown from the Arrhenius equation that any curable adhesive that cures sufficiently rapidly at the recovery temperature of the article should suffer from a poor storage life or that an adhesive that does have a long storage life should not cure sufficiently rapidly at the recovery temperature of the article. However, according to the invention it is possible to overcome this problem by virtue of the synergistic increase in the rate of curing of certain adhesives when used in conjunction with a recoverable article.

This synergistic effect is most pronounced when the fusion temperature of the components is in the region of the recovery temperature of the article or the temperature to which the adhesive is heated when the article is recovered. Preferably the fusion temperature is not more than 50°, especially not more than 30° and most especially not more than 10° C. above the recovery temperature of the article. Also, preferably not more than one, and especially none, of the components has a fusion temperature of less than 50° C. Each of the components preferably has a fusion temperature in the range of 70° to 120° C. and most preferably from 70° to 100° C., and, instead or in addition, each has a fusion temperature that differs from the fusion temperature of the or each other reactive component by not more than 30° C.

In most instances the components will melt or soften at their fusion temperature although the term is intended to include sublimation of one or more components if this occurs.

In many cases the reactive components will soften and flow or otherwise fuse over a temperature range and the softening characteristics of the components may be observed by thermomechanical analysis (TMA) as described in "Thermal Analysis" by T. Daniels published by Kogan Page 1973. Accordingly, the fusion temperature or the melting point of the reactive components of the adhesive is defined herein as being the temperature at which the TMA probe has penetrated to 60% of the total thickness of the material, usually referred to as $T_{60}$. The TMA data described herein were obtained using a 6.35 mm diameter flat profile probe loaded with a 50 gramme weight and by increasing the temperature of the material at a rate of 10° C. per minute. Preferably the temperature at which reactive components of the adhesive initially become soft referred to as $T_i$ on the TMA plot) is not more than 30° C. below and especially not more than 25° C. below the melting point ($T_{60}$) of the components so that the difference between the maximum storage temperature and the minimum curing temperature can be reduced as far as possible.

Another synergistic effect that may be shown by the articles according to the invention, either instead of or in addition to the increase in rate of cure of the adhesive, is an increase in the level of curing of the adhesive as compared with the adhesive on its own. The increase in level of curing leads to improved properties such as solvent resistance and improved high temperature properties such as high temperature shear strength.

The level of cure of the adhesive may be measured in a number of ways. For example, it may be measured as an increase in the $T_{60}$ (as defined above) or, more preferably the $T_{80}$ of the adhesive, where $T_{80}$ is defined as the temperature at which the TMA probe has penetrated at 80% of the total thickness of the adhesive. In some cases the composition will cure sufficiently to prevent the probe penetrating it by 80% in which case the total depth of penetration is a better measure of cure. Another measure of the level of cure of the adhesive is its gel content which is measured by weighing a quantity of the adhesive into an extraction thimble, refluxing the adhesive for 5 to 8 hours with a solvent (e.g. 1,2-dichloroethane or tetrahydrofuran), drying the thimble in an oven for 24 hours to evaporate the solvent and, after leaving the dried thimble in the atmosphere for a further 24 hours reweighing the thimble. The gel content is then defined as the final weight of the adhesive (which is insoluble) expressed as a percentage of the initial weight of the adhesive.

The adhesive sheet cures, as stated above, by reaction of a plurality of mutually reactive components. The phrase "mutually reactive components" is defined herein as meaning components which, when mixed together in dry particulate form, will react together at the fusion temperature thereof or at least at the highest fusion temperature thereof to form a composition having a $T_{80}$ value that is at least 20° C., preferably at least 30° C. and especially at least 40° C. above the initial fusion temperature of the blend. Preferably the composition will exhibit a gel content of at least 5%, more preferably at least 10%, especially at least 20%.

Thus, another aspect of the invention provides a method of enclosing at least part of a substrate, which comprises:

(a) positioning thereon a dimensionally-recoverable article such that a curable sheet as described above is disposed between the article and substrate; and.

(b) recovering the article about the substrate and heating the curable sheet to fuse the said components, thus curing the sheet.

It is a further advantage of the present invention that the respective regions of the sheet can be arranged so that portions of both (or all) of the curable components are in contact with the substrate and the recoverable article, thus minimising the risk of excess of one or the other component accumulating at the interface with the substrate or article, which can occur with layered constructions.

There is essentially no limit on the size of the respective regions in that the sheet can still show a synergistic increase in rate and/or level of cure even with quite large regions, although the absolute value of the cure rate may tend to decrease with large regions. Preferably the regions will be elongate with a width of at least 0.2 mm, for example 0.25 to 0.3 mm, and more preferably at least 0.5 mm, for example 0.7–0.8 mm, although larger sizes such as 1.0–1.25 mm can be used. It is surprising that adequate shelf life and cure performance can be achieved with such relatively small regions, but it is to be understood that these preferred dimensions do not limit the regions to any particular shape, any shapes or cross-sections being perfectly acceptable provided they can be adequately incorporated into the sheet.

The curable sheet may, if desired, consist solely of the reactive components although it is preferred for it to include one or more inert components in regions interspersed with those of the reactive components, or mixed with the reactive components or both. For example, the sheet may comprise regions containing curable resin such as an epoxy resin, preferably one based on bisphenol A or on epoxy novolak resin, as one component and regions containing a curing agent such as an amine, carboxylic acid, phenolic resin or isocyanate curing agent as the other. The curing agent may itself be an extrudable polymer, for example it may be a polyamide having free amino groups or a carboxylated polymer such as an ethylene/acid terpolymer, in which case it need not contain any inert component. If the curing agent is not polymeric, for example an organic peroxide or other free radical initiator, it may be desirable for it to be blended with a polymeric material, e.g. a polyester or a reactive or unreactive polyamide before being formed into the sheet. The curable resin may, instead, comprise a polyamide having free amine groups, in which case the curing agent preferably comprises a material having free or blocked isocyanate functional groups, e.g. a cresyl blocked isocyanate.

The polyamides that are most suitable to act as one of the components are those that are conventionally used as hot-melt adhesives. These polyamides are characterized by the fact that their amide linkages are separated by an average of at least fifteen carbon atoms and have amorphous structures in contrast with the more hightly crystalline, fibre forming polyamides such as nylon 6 or nylon 6.6. The polyamides preferably have an amine number of at least 1, preferably at least 5.

Chemical curing accelerators may also be present in the curable sheet, either blended with one of the reactive components or in separate regions of the sheet, provided that they do not unacceptably increase the rate of cure at storage temperatures, thus unacceptably decreasing the storage life of the sheet. Examples of accelerators include dimethylaminopyridine, tris (dimethylaminomethyl) phenol, tin octoate, imidazole or imidazole derivatives such as salts, substituted imidazoles or metal complexes thereof.

A number of inert components may be incorporated in the compositions as long as they do not adversely affect the formation of the required sheet, and preferably do not affect the increase in rate or level of cure of the adhesive composition. Also it is preferred that they do not adversely affect the storage life of the adhesive.

Inert components that may be incorporated in the adhesive composition include plasticisers such as phthalates or rosin esters, thermoplastic or thermo-setting polymers, cured or uncured rubbers, inorganic materials to modify the properties of the uncured or cured adhesive such as reinforcing fillers, reinforcing fibres or microspheres, or tackifiers and the like. The other components, whether organic or inorganic, may be in any appropriate physical form, for example they may be in the form of powder, flake or fibres, and are preferably present in an amount of from 5 to 50 percent by weight based on the total weight of the composition. In a preferred aspect of the invention the adhesive composition contains one or more other components having a softening temperature range (from the initial softening temperature to $T_{60}$) that is greater than that of the reactive components so that the softening temperature range of the adhesive composition as a whole is greater than that of the reactive components, preferably by at least 5° C. This has the advantage that, whilst the adhesive will cure when heated to only a relatively low temperature above the maximum storage temperature, it will possess cohesive and adhesive strength over a significantly greater temperature range. Alternatively, in some cases where the reactive components have a large softening temperature range it may be desirable to reduce the softening temperature range of the adhesive composition by incorporation of the appropriate components for example tackifier resins such as hydrogenated rosin esters and terpene phenols or polar waxes such as polyamide and polyester waxes.

As examples of other components that may be incorporated in the adhesive compositions subject to satisfactory formation of the sheet, there may be mentioned tacky materials such as pressure sensitive adhesives or mastics, or thermoplastic materials. The components are preferably, although not necessarily, fluid at temperatures below the melting point of the reactive components, but if they are not they should be such as to allow the reactive components to mix together at the recovery temperature of the recoverable articles with which the curable sheet is preferably used.

The sheet according to the invention may be carried on recoverable articles in a number of configurations depending on the particular use. The articles may be in the form of a tube that has been extruded and expanded radially to render it heat-recoverable, the tube being either in continuous lengths or discrete pieces and carrying on its internal surface the curable sheet adhesive compositions. Alternatively, the articles may be in the form of a sheet or tape that can be wrapped or wound around an object. More complex shapes, commonly referred to as boots, transitions, udders or caps, may be formed by moulding the articles in the desired configuration and then expanding them or methods described in our U.K. Published Patent Application Nos. 2083403A and 2083859A. The sheet of the present invention is also suitable for the use on wrap-around devices. So called wrap-around devices are employed for sealing, insulating or otherwise protecting a substrate where the use of a preformed tubular article such as a sleeve is not possible or convenient e.g. in the case where the end of an elongate substrate is not accessible. In general, such wrap-around articles comprise at least a portion thereof which is adapted to be wrapped around a substrate to be covered and secured in tubular form by closure means. Thereafter, the wrap-around closure may be heat-recovered tightly onto the substrate by application of heat. Examples of wrap-around devices are known.

In hollow articles, either moulded as such or formed by wrapping, the curable adhesive sheet may be advantageously positioned as a ring on the interior surface at or near an aperture in the wall of the article to seal the aperture to a substrate about which the article is to be recovered in use.

Another preferred article which may carry the sheet according to the invention is in the form of a continuous tape or sheet, one surface of which carries the curable sheet. Such an article may be wound helically around a substrate for example a metal pipe which is preferably pre-heated, and the wound portions of the tape or sheet may be heated to recover the tape or sheet and cure the curable adhesive. Often it is desired to operate further on the pipe shortly after the protective article has been recovered thereon, for example to bury it in a pre-dug trench and, because of the rapid cure of the adhesive composition, it is possible to perform such operations only a few minutes after the tape or sheet according to the invention has been recovered thereon.

The curable sheet may be attached to the heat-recoverable article in a number of ways depending on the type of article and curable sheet. For example, where the article has an open, generally uniform configuration, it may be provided with a layer of tacky material for example pressure sensitive adhesive layer e.g. by spraying or in the form of a tape, and the curable sheet may be applied thereto by application of pressure, pressures in the order of 0.8 MPa (120 p.s.i.) and temperatures of about 15° to 30° C. having been found suitable in practice. Other methods such as welding or sewing can also be used to attach the sheet.

In another method of applying the curable sheet, it is coated with other components which preferably comprise or include a pressure-sensitive adhesive or a mastic and the whole composition is pressed onto the heat-recoverable article, the temperatures and pressures used preferably being the same as those mentioned above.

Direct extrusion of the curable sheet onto suitably shaped recoverable articles is also possible. The ratio of the reactive components is preferably stoichiometric 1:1, but may vary within the range from 1:9 to 9:1 to suit particular requirements of materials and level of cure.

According to yet another aspect, the sheets of this invention may comprise three mutually reactive components of an adhesive composition comprising:

(a) a thermoplastic polyamide having reactive amine groups;

(b) a thermoplastic copolymer of an alkene, preferably ethylene, with an ethylenically unsaturated ester of an alkanol and a carboxylic acid, the ester having up to 6 carbon atoms, and optionally one or more acidic co-monomers; and (c) a thermoplastic epoxy resin.

Components (a) and (b) are preferably present in a ratio of from 35:65 to 75:25, preferably from 35:65 to 65:35, more from 40:60 to 60:40 and especially from 45:55 to 55:45 by weight, and component (c) is preferably present in an amount of from 8 to 79 parts per hundred parts of (a) and (b) combined by weight.

Component (b) preferably has an acid number of at least 1 and preferably also has an acid number of less than 100. The term "copolymer" as used herein in connection with component (b) is intended to include terpolymers and polymers containing four or more comonomers. The preferred comonomers are vinyl acetate and ethyl acrylate optionally with an unsaturated carboxylic acid e.g. acrylic acid. Examples of materials that may be used include those described in U.S. Pat. No. 4,018,733.

The epoxy used for component (c) may comprise any of a number of epoxies for example those based on novolak resins or on bisphenol A, and may have a wide range of epoxy values provided it remains thermoplastic. Any of the polyamides mentioned above will in general be suitable as component (a).

Preferably, each of the components (a), (b) and (c) has a melting or softening point ($T_{60}$) in the range of from 60° to 120° C., more preferably from 70° to 120° C. and especially from 70° to 100° C.

The adhesive components used in the sheet according to the invention have a softening point that increases on application from the melting or softening points of the components, e.g. in the order of 90° to 95° C. to a value of about 130° to 140° C. or even higher and so combine low initial application temperatures with relatively high use temperatures. Furthermore, whilst the cured sheet exhibits relatively high bond strengths when subject to shear stresses it also exhibits surprisingly high bond strengths at high temperatures in the peel mode, e.g. in the order of 80 to 100N (25 mm)$^{-1}$ between polyethylene substrates in contrast with conventional epoxy adhesives which have extremely low peel strengths.

In the following Examples, which illustrate the invention, sheets or tapes were formed on standard extrusion equipment using two 32 mm bore, 25:1 length:diameter ratio extruders feeding the respective components A and B given in the examples to two separate feed galleries in a die head which consisted of a single row of 26 holes, 1.25 mm dia on 2 mm centres, alternately connected to the two separate feed galleries within the head.

The resulting strands of A and B, emerging from the holes, were formed into a sheet by a pair of adjustable die lips 10 mm deep. The thickness of the resulting tape is determined by the die lip gap and the draw rate.

Tapes with the following formulations have been manufactured.

EXAMPLE 1

Component A: MACROMELT 6071, Polyamide made (60 Parts) by Henkel (Amine No. 20–40);

Component B: (Epicote 1004 Epoxy made by Shell (40 parts) (Epoxy equivalent 900));

Gel of sheet alone heated 15 minutes at 150° C.=5%;

Gel of sheet under heat-shrink sleeve 15 min. at 150° C.=30% (50% unresolved recovery);

Gel of sheet after 4 weeks at 50° C.=5%.

EXAMPLE 2

Component A: MACROMELT 6301, Polyamide made (40 parts) by Henkel (Amine No. 10–20);

Component B: Epicote 1001 Epoxy made by Shell (60 parts) (Epoxy equivalent 475));
Gel of sheet alone heated 15 min. at 150° C.=7%;
Gel of sheet under heat-shrink sleeve 15 minutes at 150° C.=27% (50% unresolved recovery);
Gel of sheet after 5 weeks at 50° C.=3%.

EXAMPLE 3

Component A: MACROMELT 6071 (See Ex. 1) (50 parts);
Component B: Epicote 1001 Epoxy (See Ex. 2) (50 parts);
Gel of sheet alone heated 15 minutes at 150° C.=8%;
Gel of sheet under heat-shrink sleeve 15 min. at 150° C.=46% (50% unresolved recovery);
Gel of sheet after 4 weeks at 50° C.=1.3%.

DESCRIPTION OF THE DRAWINGS

In the accompanying drawings.

EXAMPLES 4 TO 6

Figure 1:
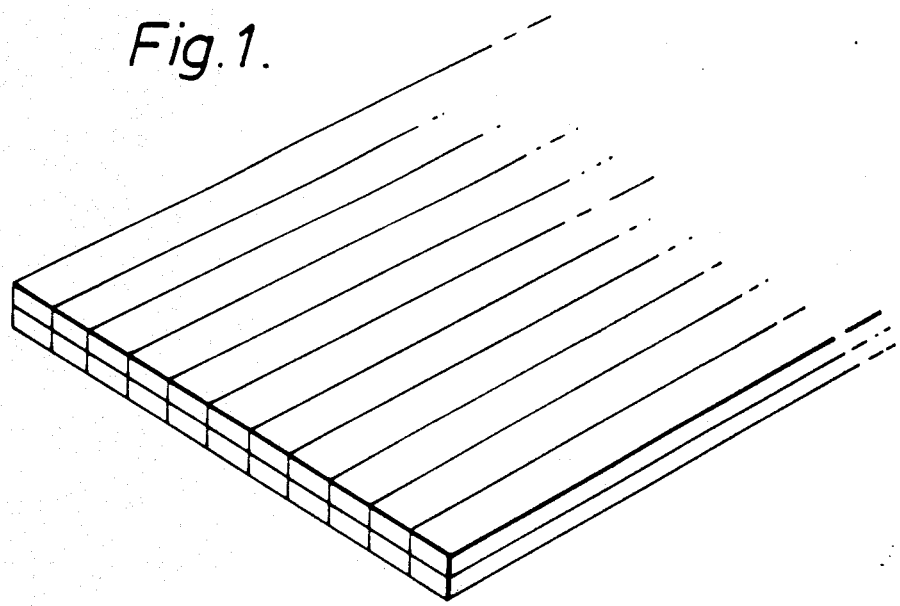
FIG. 1 illustrates a "striped" arrangement of the curable sheet in a manner thought to be self-explanatory except that two offset layers of "stripes" are shown, these being producable by a die having two rows of holes with suitable connections to the feed galleries of the extruder.
Figure 2:
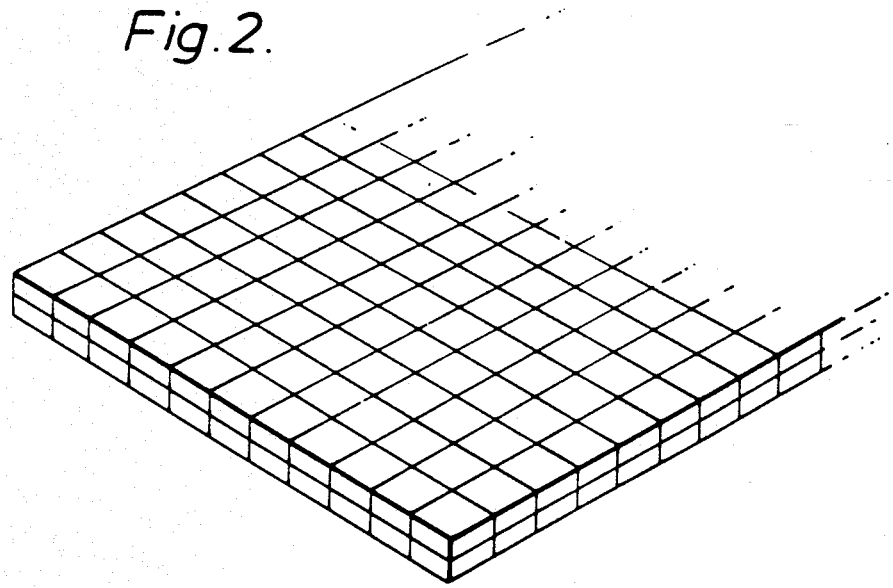
FIG. 2 shows a corresponding "chequer board" arrangement, producable by means of a "moving gate" extrusion head illustrated schematically in FIGS. 3 and 4.
Figure 3:
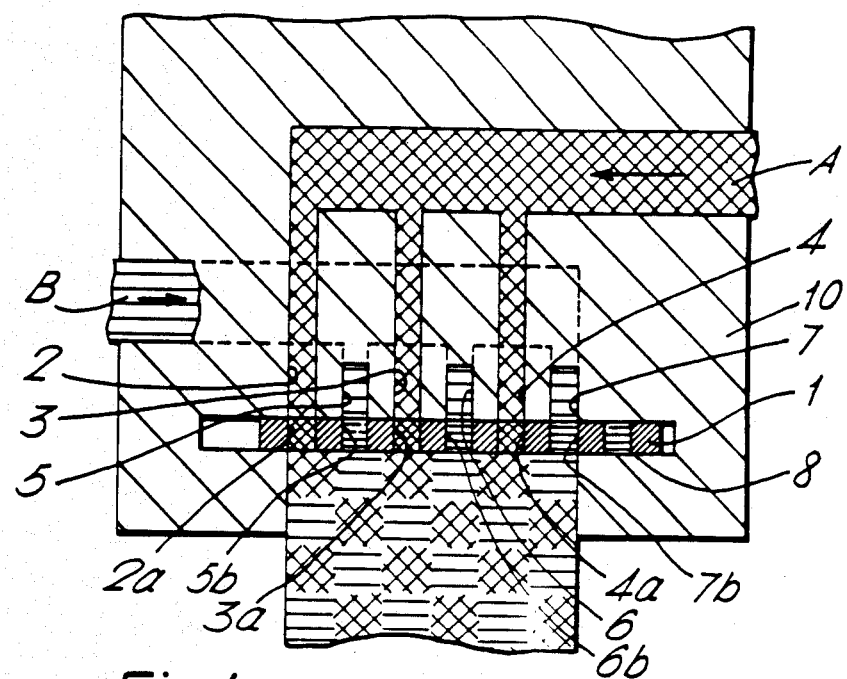
In FIG. 3, the moving gate 1 is shown in its first position within extrusion head 10 allowing extrusion of "stripes" of component A from extrusion holes 2, 3 and 4 through gate holes 2a, 3a, 4a and stripes of component B from extrusion holes 5, 6 and 7 through gate holes 5b, 6b, 7b, with "spare" gate hole 8 at the right of the gate filled with component B.
Figure 4:
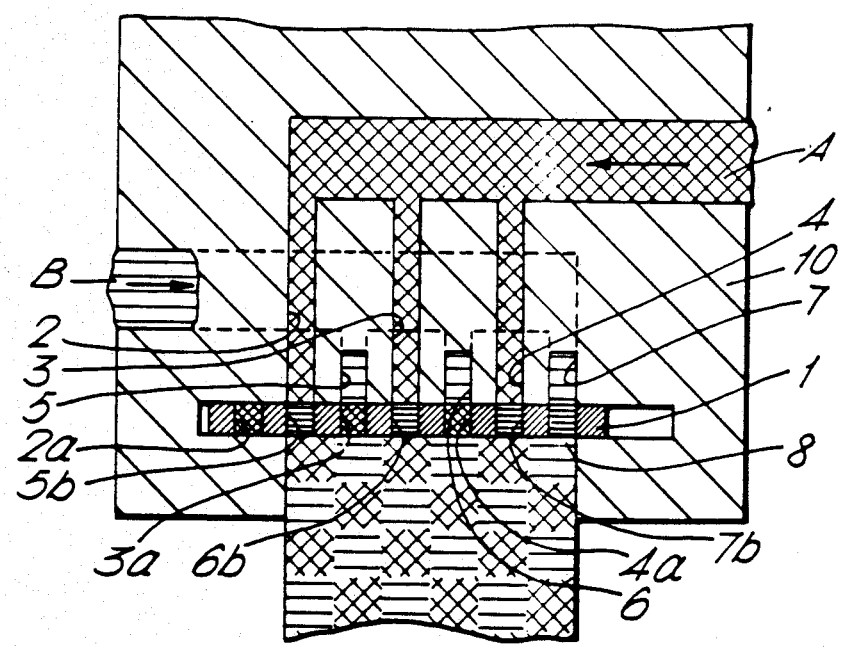
In FIG. 4, the gate 1 is shown in its second position, in which gate holes 3a, 4a and 8 are in alignment with extrusion holes 5, 6 and 7; and gate holes 5b, 6b and 7b are in alignment with extrusion holes 2, 3 and 4, with gate hole 2a filled with Component A now acting as "spare" at the left of the gate. It will be understood that repeated movement of the gate between these two positions causes alternating portions of Components A and B to be extruded in each "stripe", thus producing the "chequer board" arrangement of sheet or tape regions containing the respective components. Angular or rotary movement of a suitably-shaped gate and extrusion head could of course be substituted for the to-and-fro linear movement illustrated.

Examples 1 to 3 were repeated using the equipment described with reference to FIGS. 3 and 4 to produce "chequer board" sheets which had storage and curing characteristics similar to those of Examples 1 to 3.

EXAMPLE 7

A tape, 50 mm wide, of cross-linked high density polyethylene stretched to a ratio of 1.5 to 1, was passed under the previously described die at a distance of 10 mm from the die lips. A layer of the reactive sheet 1 mm thick composed of a 1:1 ratio of MACROMELT 6301 polyamide and SHELL EPICOTE 1001 Epoxy was extruded directly onto the tape.

An exceptionally flexible sheet according to this invention can be made by incorporating suitable (preferably inert) binders with at least one of the reactive components and it has surprisingly been found that acceptable rate of cure in use can be maintained by adding low molecular weight, preferably liquid, reactive material capable of reacting with the other reactive component(s). An example of such a formulation follows, percentages being by weight.

EXAMPLE 8

| Epoxy component: | |
| --- | --- |
| Binder Elvax 40 (EVA) | 44.5% |
| Epoxy Epikote 828 | 45% |
| Epoxy Epikote 1004 | 10% |
| Colouring Ultramarine Blue | 0.5% |

| Polyamide component: | |
| --- | --- |
| Polyamide Versalon 1300 | 90% |
| Polyamide Versamid 140 | 10% |

Compounding and coextrusion along the lines described above produced a very flexible striped sheet which cured readily during heat recovery of a heat-recoverable polyethylene sheet thereon.

We claim:

1. An assembly comprising (a) a heat-recoverable article and (b) a curable sheet comprising a plurality of discrete regions of each of at least two mutually reactive polymeric components which components are fusion bonded to each other at least at the mutual edge interfaces of their respective sheet regions in a substantially fixed spatial arrangement such that the said two components will react together to effect curing of the sheet when said heat-recoverable article is heat-recovered thereon.

2. An assembly according to claim 1, wherein the said two components have been coextruded to form the respective regions.

3. An assembly according to claim 1 or 2 wherein the respective regions lie substantially parallel to one another and are interspersed with one another across the main surface of the sheet in a sense transverse to the direction of parallel lie.

4. An assembly according to claim 1 or 2, wherein the respective regions are interspersed with one another laterally and longitudinally in a plane lying parallel with the main surfaces of the sheet.

5. An assembly according to claim 1 or 2, said sheet comprising at least two layers of the said regions, wherein the respective regions of each component in each layer are offset from the corresponding regions in the immediately adjacent layer(s).

6. An assembly according to claim 1 or 2, wherein the respective regions of the two components alternate with each other.

7. An assembly as claimed in claim 1 or 2, wherein each of the reactive components has a fusion temperature that is not more than 50° C. above the recovery temperature of the heat-recoverable article.

8. An assembly as claimed in claim 1 or 2, wherein each of the reactive components has a fusion temperature in the range of from 70° to 120° C.

9. An assembly as claimed in claim 1 or 2, wherein each of the reactive components has a fusion temperature that differs from the fusion temperature of the or each other reactive component by not more than 30° C.

10. An assembly as claimed in claim 1 or 2 wherein said sheet includes one or more non-reactive components and has a softening temperature range that is greater than the softening temperature range of the reactive components.

11. An assembly as claimed in claim 1 or 2, wherein one of the reactive components comprises an epoxy resin and the other reactive component comprises a thermoplastic polyamide resin having free amine groups.

12. An assembly according to claim 1, wherein said sheet comprises regions of three reactive polymeric components, which components are
(a) a thermoplastic polyamide having reactive amine groups;
(b) a thermoplastic copolymer of an alkene with an ethylenically unsaturated ester of an alkanol and a carboxylic acid, the ester having up to 6 carbon atoms, and optionally one or more acidic comonomers; and
(c) a thermoplastic epoxy resin.

13. An assembly according to claim 1 or 2, wherein at least one of the reactive components incorporates a polymeric binder and a low molecular weight or liquid reactive material capable of reacting with the other reactive component(s).

14. A dimensionally recoverable article having on at least part of a surface thereof a curable sheet comprising a plurality of discrete regions of each of at least two mutually reactive polymeric components which components are fusion bonded to each other at least at the mutual edge interfaces of their respective sheet regions in a substantially fixed spatial arrangement such that the said two components will react together to effect curing of the sheet when said dimensionally-recoverable article is recovered thereon.

15. An article as claimed in claim 14 which is in the form of a tube and carries the curable sheet on at least part of its inner surface.

16. An article as claimed in claim 14 which is in the form of a sheet and carries the curable sheet on at least part of one surface thereof.

* * * * *